(12) United States Patent
Thomas (10) Patent No.: US 9,446,732 B2
(45) Date of Patent: Sep. 20, 2016

(54) SIDE PILLAR AIR CURTAIN GUIDE (71) Applicant: FORD GLOBAL TECHNOLOGIES, LLC, Dearborn, MI (US)

(72) Inventor: Andrew P. Thomas, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/303,996

(22) Filed: Jun. 13, 2014

(65) Prior Publication Data

US 2015/0360635 A1 Dec. 17, 2015

(51) Int. Cl.
*B60R 21/04* (2006.01)
*B60R 21/213* (2011.01)
*B60R 21/16* (2006.01)
*B60R 21/00* (2006.01)

(52) U.S. Cl.
CPC ...... *B60R 21/213* (2013.01); *B60R 2021/0006* (2013.01); *B60R 2021/0048* (2013.01); *B60R 2021/0414* (2013.01); *B60R 2021/0435* (2013.01); *B60R 2021/161* (2013.01)

(58) Field of Classification Search
CPC .............. B60R 2021/0414; B60R 2021/0435; B60R 2021/161; B60R 13/025
See application file for complete search history.

(56) References Cited

U.S. PATENT DOCUMENTS

| 3,871,636 | A | * | 3/1975 | Boyle ........................... 267/140 |
| 5,660,426 | A | * | 8/1997 | Sugimori et al. ........ 296/187.05 |
| 5,709,407 | A | * | 1/1998 | Stephens et al. ............. 280/751 |
| 5,992,924 | A | * | 11/1999 | Noritake et al. ......... 296/187.05 |
| 6,068,320 | A | * | 5/2000 | Miyano ........................ 296/39.1 |
| 6,170,861 | B1 | | 1/2001 | Tietze |
| 6,217,061 | B1 | * | 4/2001 | Harland et al. ............. 280/730.2 |
| 6,264,238 | B1 | * | 7/2001 | MacDonald et al. ......... 280/751 |
| 6,557,929 | B2 | * | 5/2003 | Fox et al. ................ 296/193.06 |
| 6,719,321 | B2 | | 4/2004 | Yasuhara et al. |
| 6,843,502 | B2 | | 1/2005 | Aoki et al. |
| 7,578,521 | B2 | | 8/2009 | Downey et al. |
| 7,934,748 | B2 | | 5/2011 | Torii |
| 7,963,551 | B2 | | 6/2011 | Matsuoka et al. |
| 2001/0045762 | A1 | * | 11/2001 | von Holst et al. ............ 296/214 |
| 2010/0259036 | A1 | * | 10/2010 | Taracko ........................ 280/752 |

FOREIGN PATENT DOCUMENTS

| JP | 4523182 B2 | 8/2010 |
| JP | 5098850 B2 | 12/2012 |

OTHER PUBLICATIONS

Machine Translation of JP2002220024A also published as JP4523182B2.
Machine Translation of JP2010006289A also published as JP5098850B2.

\* cited by examiner

*Primary Examiner* — Ruth Ilan
(74) *Attorney, Agent, or Firm* — Vichit Chea; King & Schickli, PLLC (57) ABSTRACT

A side pillar air curtain guide includes a main body having an air curtain ramp formed by a plurality of ribs. Those ribs project from the main body at an acute and included angle with the main body so as to provide enhanced deformability in a horizontal direction as an energy absorbing countermeasure in the event of a head impact by an occupant of the vehicle when in a side impact collision.

16 Claims, 10 Drawing Sheets

SIDE PILLAR AIR CURTAIN GUIDE

TECHNICAL FIELD

This document relates generally to air curtain systems for protecting vehicle occupants in side impacts and, more particularly, to a side pillar air curtain guide incorporating a ramp for guiding the air curtain over the center or B-pillar assembly of the vehicle.

BACKGROUND

Air curtains protecting occupants of a vehicle from side impacts are well known in the art. Typically such systems include an air curtain guide incorporating a ramp to direct the trajectory of the inflating curtain so that it does not contact the upper edge of the center or B-pillar trim during deployment. This is done to minimize any possibility of the pillar trim becoming detached and preventing the curtain from achieving its intended "deployed" position from which it may provide maximum safety benefit.

Side air pillar curtain guides are typically very rigid in order to provide the desired ramp function when contacted by the rapidly inflating air curtain. In contrast to the required strength to withstand the initial impact and guide the inflating air curtain, the air curtain guide must also incorporate energy absorbing countermeasures in the event of a head impact so as to minimize potential injury to a vehicle occupant. In the past, these countermeasures have typically occupied space behind the headliner that drives the surface of the headliner into the interior of the cabin compromising the interior roominess of the vehicle.

This document relates to a side pillar air curtain guide that provides the necessary strength for properly guiding a rapidly inflating air curtain while also providing the desired energy absorbing characteristics necessary to minimize head injury in the event of a head impact. Further this is achieved in a compact structure which allows the possibility of maximizing the interior room of the passenger compartment of the vehicle.

SUMMARY

In accordance with the purposes and benefits described herein, a side pillar air curtain guide is provided. The guide includes a main body and an air curtain ramp. The air curtain ramp includes a plurality of ribs projecting from the main body at an acute included angle with the main body. In one possible embodiment the acute included angle is between 10 degrees and 60 degrees. In another possible embodiment the acute included angle is between 20 degrees and 45 degrees. In yet another possible embodiment the acute included angle is about 30 degrees.

Each rib of the plurality of ribs has a thickness of between 1.5 mm and 3.5 mm. Further the space between ribs is between 3.0 mm and 6.0 mm. Each rib of the plurality of ribs has an upper edge extending downwardly at an angle of between 110 degrees and 150 degrees relative to vertical. In another possible embodiment each rib of the plurality of ribs has an upper edge extending downwardly at an angle of about 130 degrees relative to vertical.

More specifically, the guide may be made of one-piece construction. Further the guide may include a recess where the plurality of ribs project into the recess. In one embodiment the guide is made from plastic. In another embodiment the guide is made from a composite material incorporating a polymer and reinforcing fibers.

In still another embodiment the guide includes a cantilevered chute that overlies the plurality of ribs and is spaced therefrom by about 3.0 mm to about 6.0 mm. In one possible embodiment the plurality of ribs project beyond the chute. In one possible embodiment both the chute and the ribs project from the main body between about 10 mm and about 30 mm. In one possible version of this embodiment the plurality of ribs have a thickness of between about 2.5 mm and about 3.5 mm and the spacing between the ribs is between about 3.0 mm and about 6.0 mm. Further each rib of the plurality of ribs has an upper edge extending downwardly at an angle of between 110 degrees and 150 degrees relative to vertical.

In the following description, there are shown and described multiple embodiments of the side pillar air curtain guide. As it should be realized, the side pillar air curtain guide is capable of other, different embodiments and its several details are capable of modification in various, obvious aspects all without departing from the guide as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the air curtain guide and together with the description serve to explain certain principles thereof. In the drawings.

Reference will now be made in detail to the present preferred embodiments of the guide, examples of which are illustrated in the accompanying drawings.

DETAILED DESCRIPTION

Figure 1:
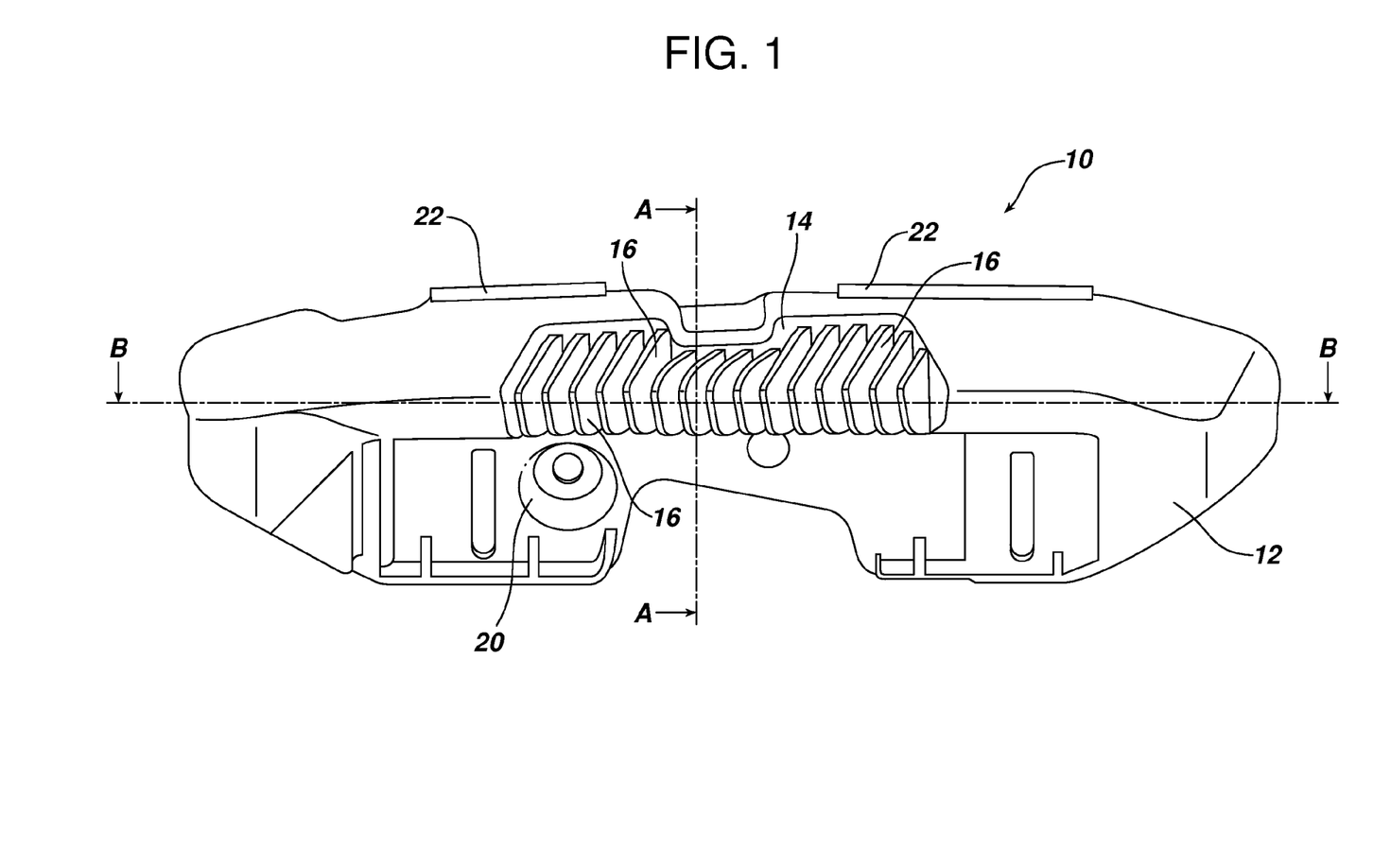
FIG. 1 is a front elevational view of a first embodiment of side pillar air curtain guide.
Figure 2:
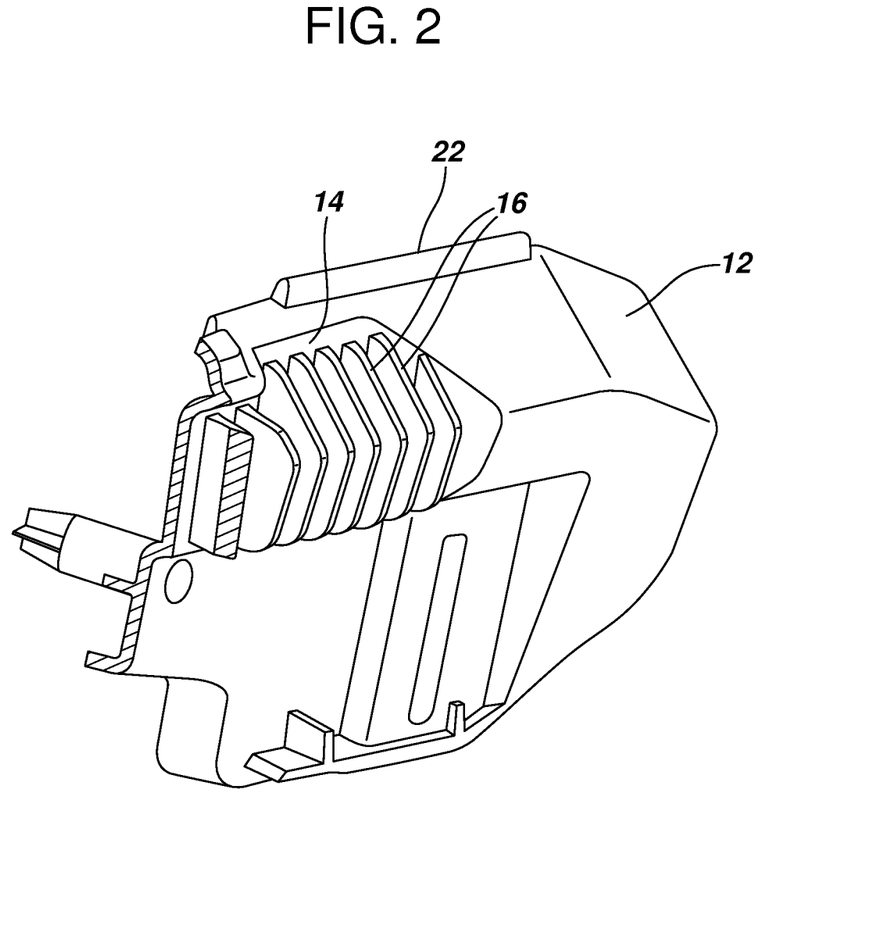
FIG. 2 is a transverse cross-sectional view of the embodiment illustrated in FIG. 1.
Figure 3:
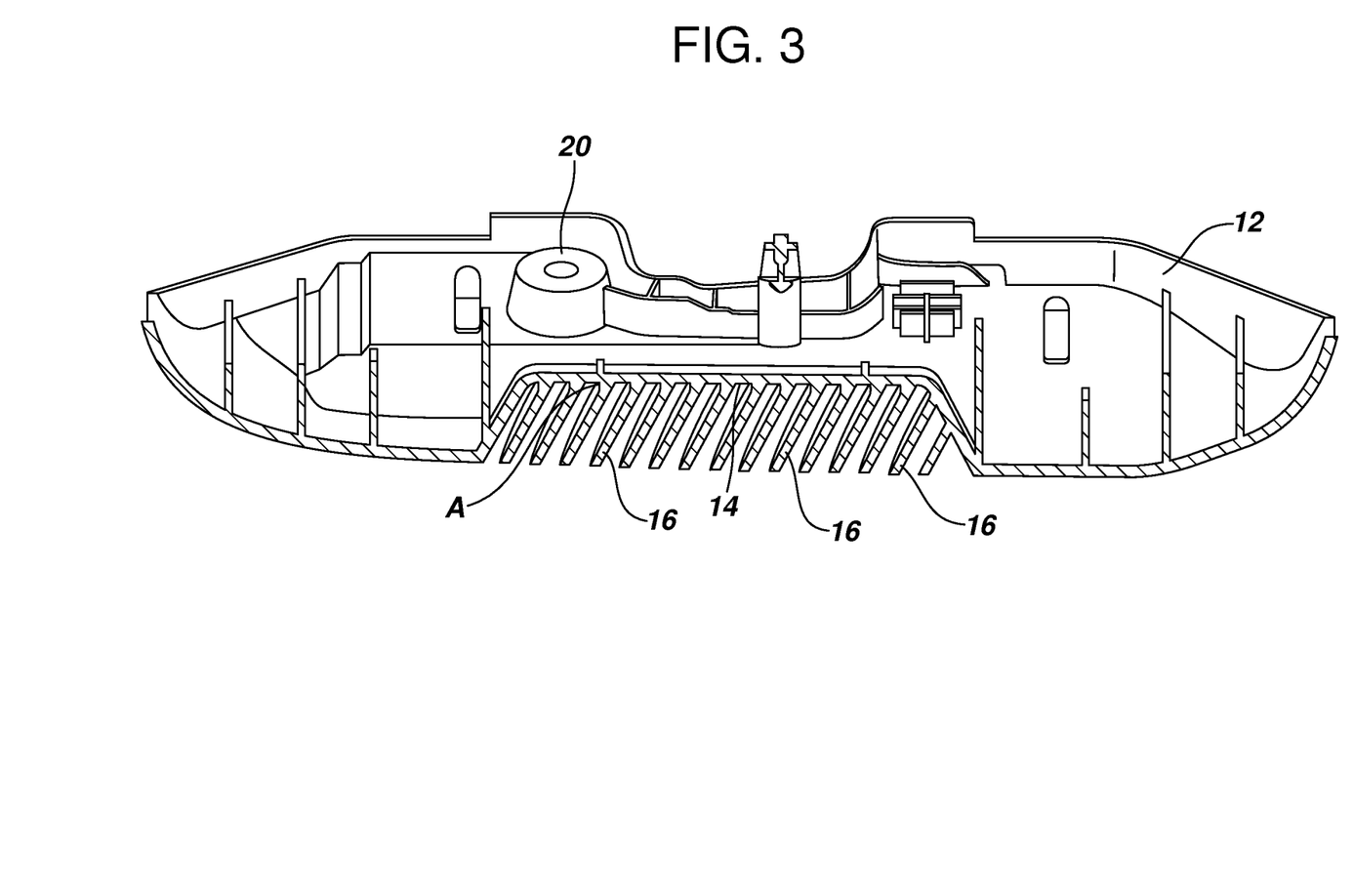
FIG. 3 is a longitudinal cross-sectional view of the embodiment illustrated in FIG. 1.

Reference is now made to FIGS. 1-3 illustrating a first embodiment of the side pillar air curtain guide 10. The guide 10 includes a main body 12 incorporating a lateral recess 14. A plurality of ribs 16 project from the main body 12 into the recess 14. Significantly, the ribs 16 project from the main body 12 at an acute and included angle A so that they are characterized by enhanced deformability which provides desirable energy absorbing characteristics in the event of an impact with a head of a vehicle occupant.

In one possible embodiment the acute included angle is between 10 degrees and 60 degrees. In another possible embodiment the acute included angle is between 20 degrees and 45 degrees. In yet another possible embodiment the acute included angle is about 30 degrees. However, it should be appreciated that in any embodiment of the side pillar air curtain guide 10, the ribs 16 projecting at an acute included angle are characterized by greater deformability and greater energy absorbing characteristics than ribs set at a 90 degree angle and extending perpendicular from the main body as are known in the prior art.

As illustrated in FIGS. 1 and 2, the guide 10 may be mounted above the center pillar of the vehicle by means of a fastener, such as screw (not shown) received in the mounting boss 20. Projecting mounting flange 22 also serves to secure the guide 10 in proper position.

Figure 4:
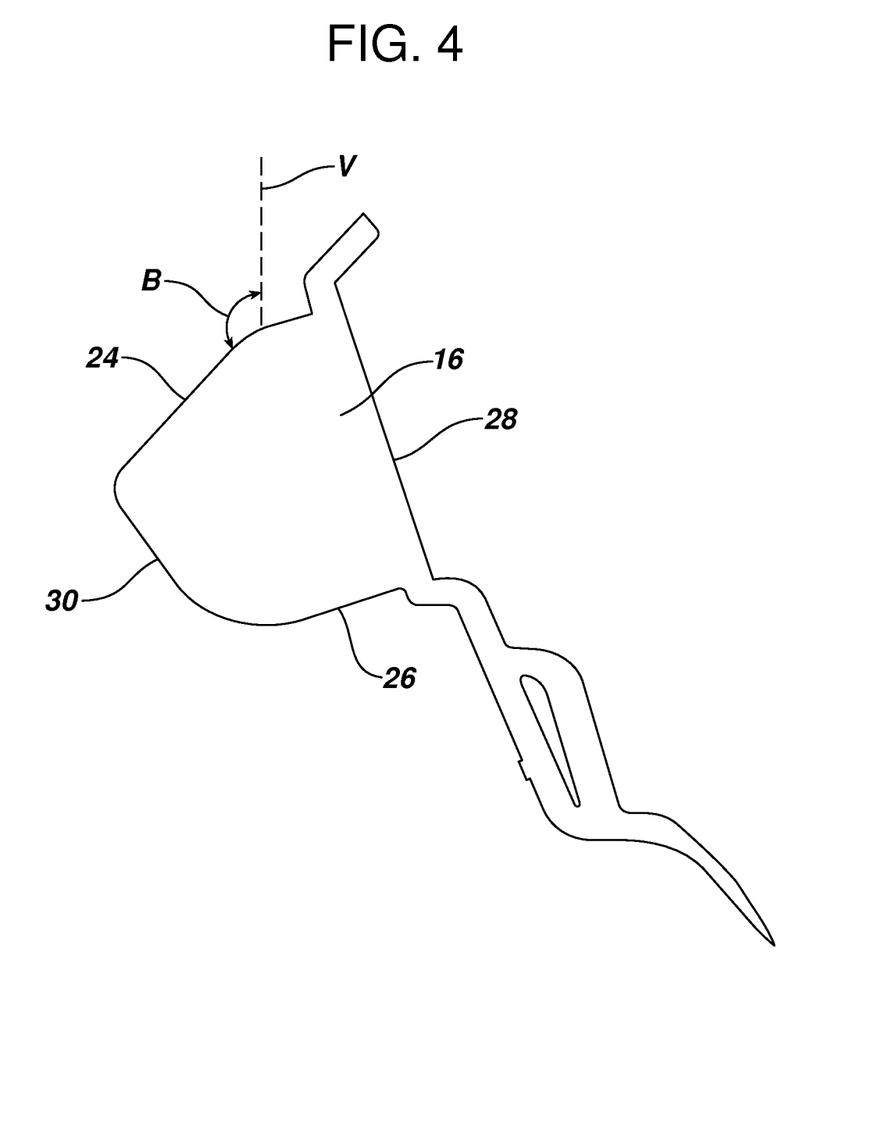
FIG. 4 is a detailed elevational view of a face of a single rib.

Reference is now made to FIG. 4 which is a detailed elevational view of a face of a single rib 16. As illustrated, each rib 16 includes an upper or top edge 24, a bottom edge 26, a proximal edge 28 connected to the main body 12 and a distal edge 30. At least a portion of the top edge 24 is inclined so as to extend downwardly at an angle B of between 110 degrees and 150 degrees relative to vertical V. In one possible embodiment that angle is about 130 degrees.

In the illustrated embodiment each rib 16 has a thickness of 1.5 mm-3.5 mm. The spacing between the ribs 16 is between 3.0 mm and 6.0 mm. The guide 10 may be made from plastic or a composite material comprising a polymer and reinforcing fibers.

Figure 5A:
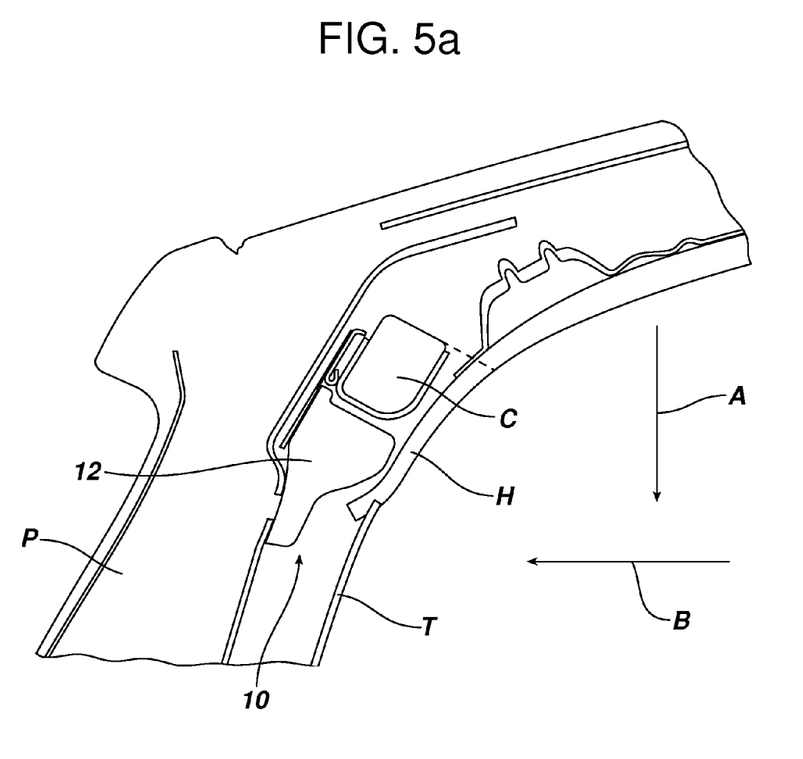
FIGS. 5*a*-5*c* schematically illustrate the deployment of a side curtain over the air curtain guide illustrated in FIGS. 1-3.
Figure 5B:
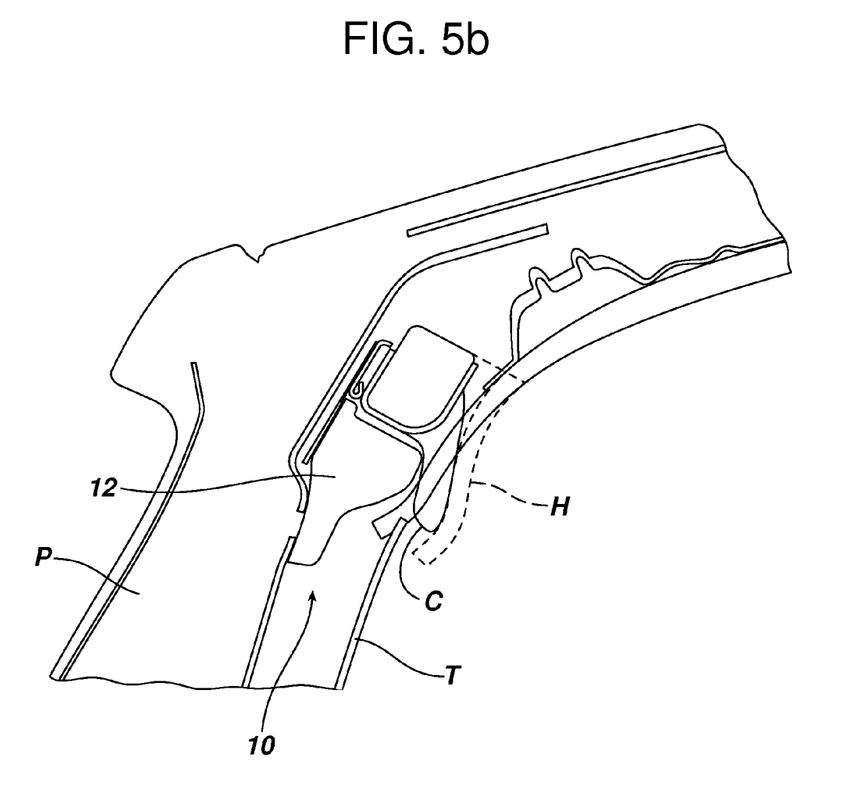
Figure 5C:
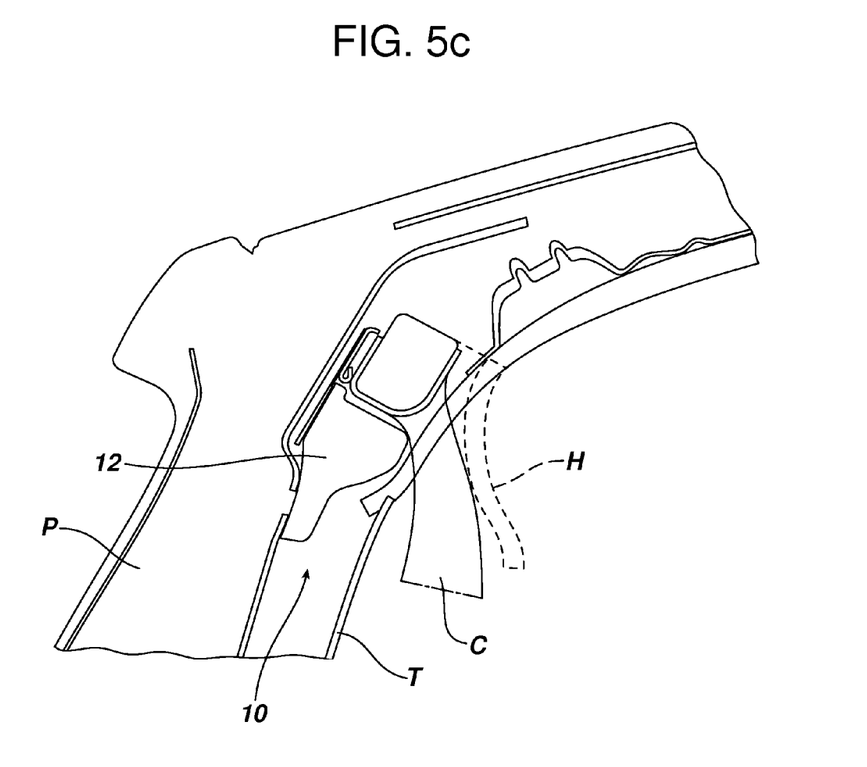

Reference is now made to FIGS. 5a-5c illustrating the deployment of a side air curtain over the guide 10. As illustrated the guide 10 is mounted to the vehicle center side pillar P (the B-pillar) between the front and rear doors so as to overlie the pillar trim T. The undeployed side curtain C is positioned overlying the guide 10 and both the side curtain C and guide 10 are hidden from view by the headliner H. As indicated in FIG. 5b, in the event of a side impact, the side curtain C is deployed. As the side curtain C is rapidly inflated, it engages and is guided by the guide 10 including that portion formed by the top edge 24 of the plurality of ribs 16. As should be appreciated, each of the ribs 16 strongly resist any deflection when engaged by the inflating side curtain C along the inclined portions of the top edge 24. Thus, the inflating curtain C is guided over the pillar trim T by the guide 10 forcing a gap between the pillar trim T and the headliner H through which the curtain is deployed into its functional and desired position for maximum benefit to the vehicle occupants. While the ribs 16 strongly resist deflection in a vertical direction (note action arrow A) so as to properly guide the inflating curtain C over the pillar trim T, they are very deformable in a horizontal direction (note action arrow B) so as to cushion any head impact that might occur at other times.

Figure 6:
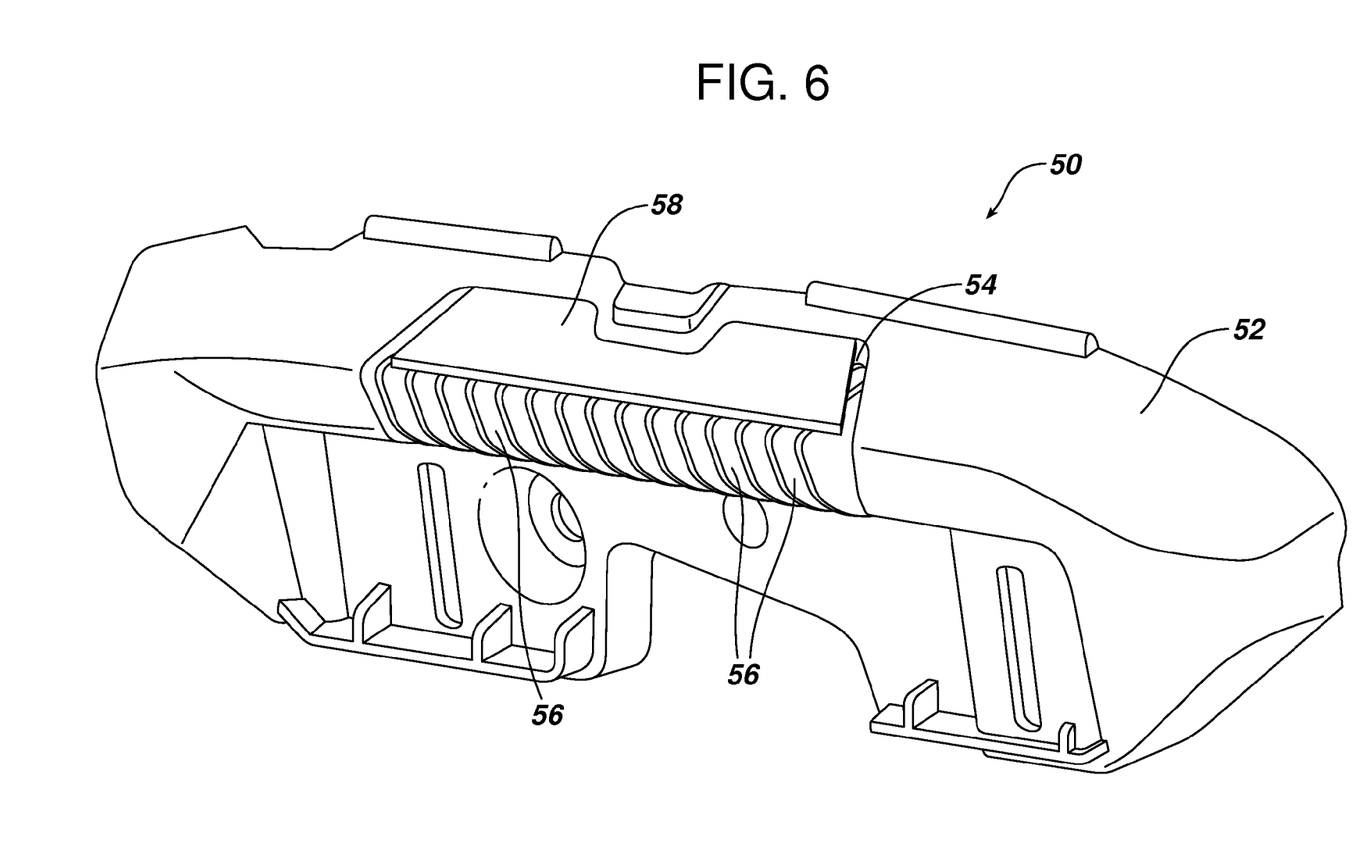
FIG. 6 is a perspective view of an alternative embodiment of side pillar air curtain guide.
Figure 7:
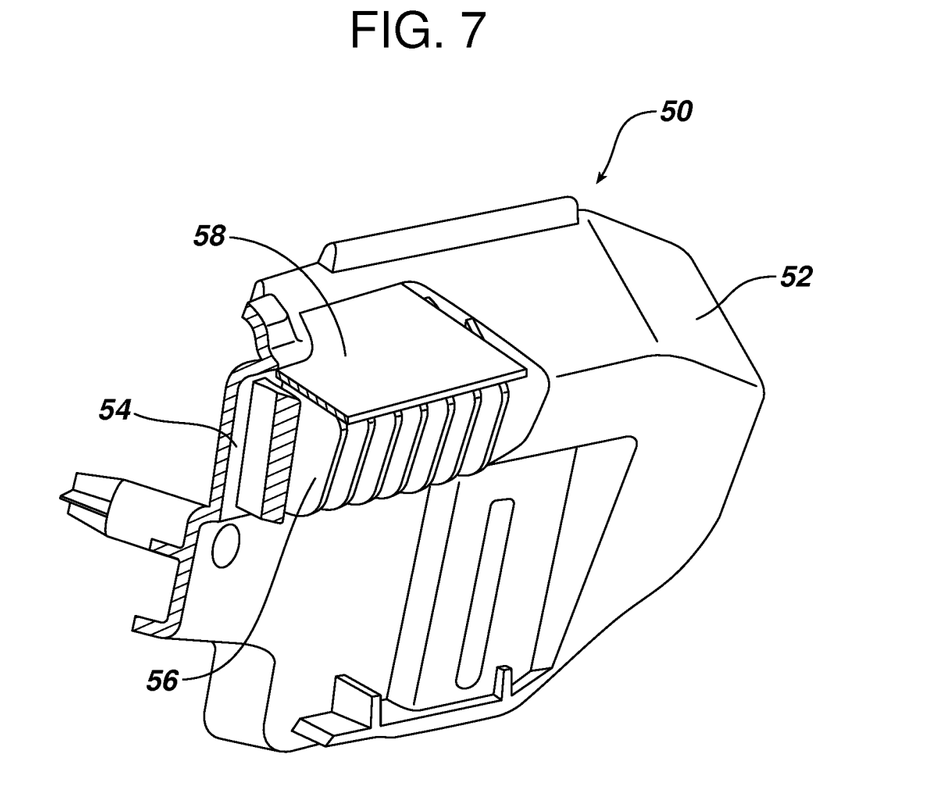
FIG. 7 is a transverse cross-sectional view of the embodiment illustrated in FIG. 5.
Figure 8:
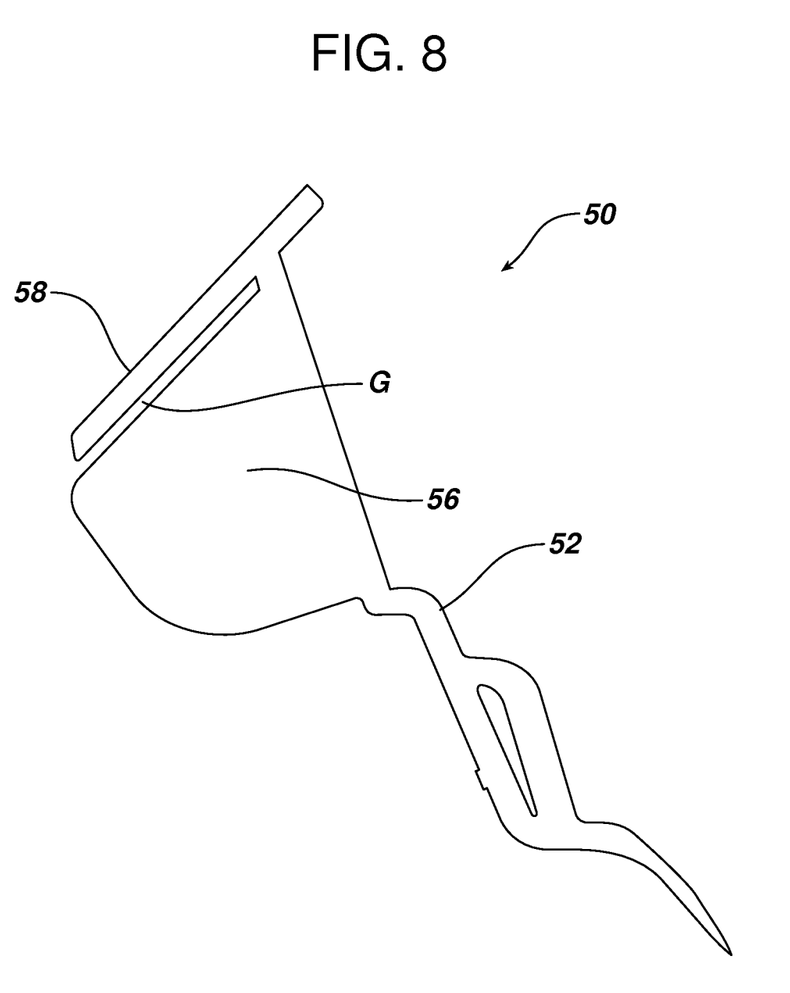
FIG. 8 is a detailed schematical illustration of the space or gap provided between the cantilevered chute or roof and the underlying ribs.

Reference is now made to FIGS. 6-8 illustrating an alternative embodiment of the side pillar air curtain guide 50. The guide 50 includes a main body 52 having a recess 54 and a plurality of projecting ribs 56 held in the recess. In contrast to the first embodiment of the guide 10 illustrated in FIGS. 1-3, the second embodiment of the guide 50 illustrated in FIGS. 6 and 7 incorporates a cantilevered chute or roof 58. As illustrated, the chute 58 overlies the plurality of ribs 52 but does not engage the upper or top edges 60 of those ribs 56 (note gap illustrated in FIG. 8). In one possible embodiment the chute 58 is spaced from the top edge of the plurality of ribs 56 by 3.0 mm to 6.0 mm. This spacing provided between the chute 58 and ribs 56 ensures that both the chute and ribs maintain desired deformability in the horizontal direction so as to provide energy absorbing properties in the event of a head impact. In contrast, if the chute 58 was connected to the ribs 56 the structure would be rigidified and the desired energy absorbing properties would not be obtained. At the same time, the chute 58 is sufficiently close to the ribs 56 so that it will only deflect a little in the vertical direction as the air curtain is inflated before it is fully supported by the ribs to then properly guide the inflating curtain over the side pillar trim.

In summary, numerous benefits result from employing the illustrated embodiments, of the side pillar air curtain guides 10, 50. Significantly both embodiments 10, 50 provide the necessary rigidity in the vertical direction to receive and guide the rapidly inflating air curtain over the side pillar trim T so that the curtain C is received in its desired deployed position where it can protect occupants of the vehicle from side impact. At the same time, both embodiments 10, 50 provide significant deformability in the horizontal direction so that they can absorb energy in the event of a head impact by an occupant of a vehicle. Thus, the guides 10, 50 are able to capably meet these seemingly conflicting requirements.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A side pillar air curtain guide for guiding an inflating air curtain during deployment, comprising:
    a main body; and
    an air curtain ramp configured to direct a trajectory of the inflating air curtain, said air curtain ramp including a plurality of ribs projecting in the same direction from said main body at an acute included angle with said main body, wherein said acute included angle is about 30 degrees such that the plurality of ribs provides energy absorbing characteristics necessary to minimize head injury to an occupant.

2. The guide of claim 1, wherein each rib of said plurality of ribs has a thickness of between 1.5 mm and 3.5 mm.

3. The guide of claim 2, further including spacing between said ribs of between 3.0 mm and 6.0 mm.

4. The guide of claim 3, wherein each rib of said plurality of ribs has an upper edge extending downwardly at an angle of between 105 degrees and 150 degrees relative to vertical.

5. The guide of claim 1, wherein each rib of said plurality of ribs has an upper edge extending downwardly at an angle of about 130 degrees relative to vertical.

6. The guide of claim 1, wherein said guide is of one-piece construction and said guide includes a recess, said plurality of ribs projecting into said recess.

7. The guide of claim 6, wherein said guide is made from a material selected from a group consisting of plastic and composite material.

8. The guide of claim 1, further including spacing between said ribs of between 3.0 mm and 6.0 mm.

9. The guide of claim 8, wherein each rib of said plurality of ribs has an upper edge extending downwardly at an angle of between 105 degrees and 150 degrees relative to vertical.

10. The guide of claim 1, further including a cantilevered chute overlying said plurality of ribs and spaced therefrom.

11. The guide of claim 10, wherein chute is vertically spaced from said plurality of ribs by 3.0 mm to 6.0 mm.

12. The guide of claim 11, wherein said plurality of ribs project beyond said chute.

13. The guide of claim 11, wherein said chute projects from said main body between 10 mm and 30 mm and said plurality of ribs project from said main body between 10 mm and 30 mm.

14. The guide of claim 10, wherein each rib of said plurality of ribs has a thickness of between 1.5 mm and 3.5 mm.

15. The guide of claim 14, further including spacing between said ribs of between 3.0 mm and 6.0 mm.

16. The guide of claim 15, wherein each rib of said plurality of ribs has an upper edge extending downwardly at an angle of between 105 degrees and 150 degrees relative to vertical.

* * * * *